(No Model.)
E. O. PHILLIPS & G. CLASS, Jr.
CLOTHES LINE SUPPORT.
No. 554,497.   Patented Feb. 11, 1896.
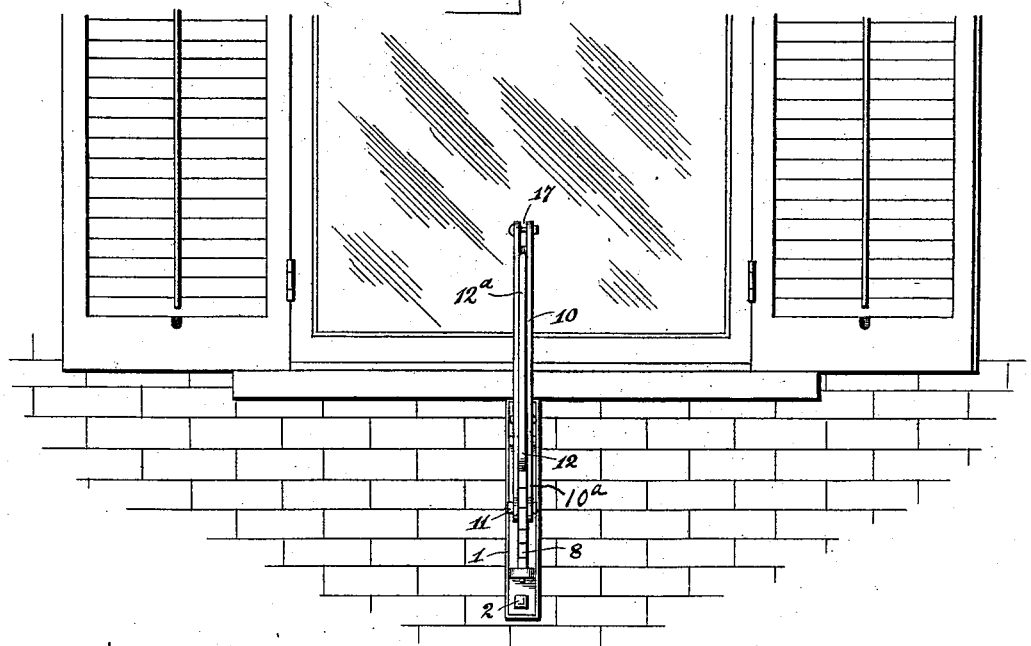
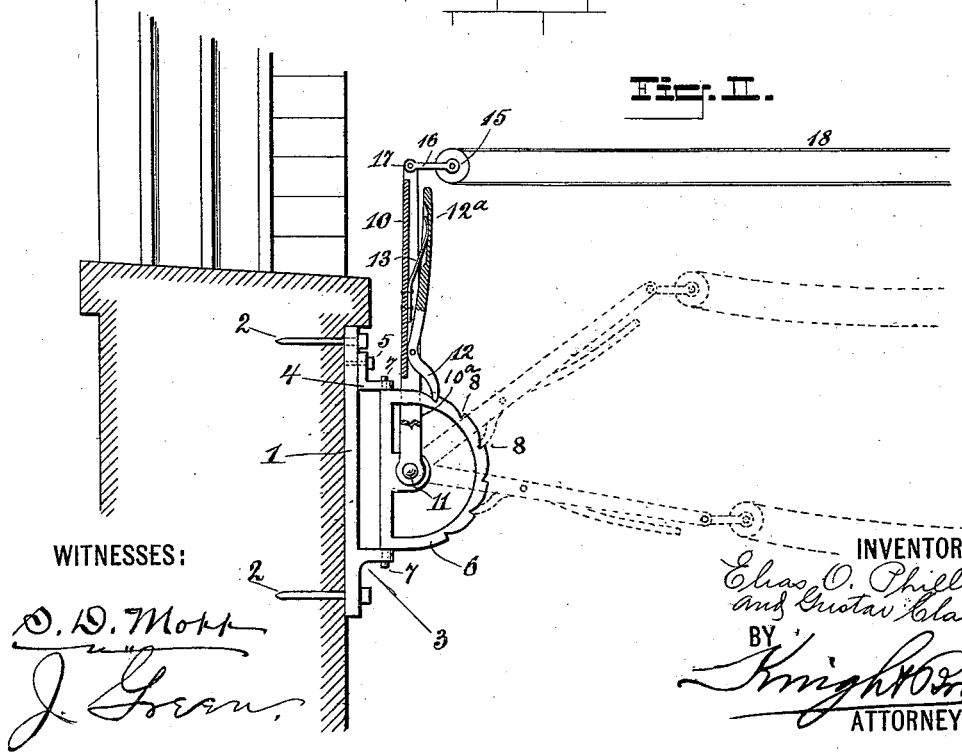
WITNESSES:
INVENTORS
Elias O. Phillips
and Gustav Class Jr.
BY
Knight Bros.
ATTORNEY

UNITED STATES PATENT OFFICE.

ELIAS O. PHILLIPS AND GUSTAV CLASS, JR., OF UNION, NEW JERSEY.

CLOTHES-LINE SUPPORT.

SPECIFICATION forming part of Letters Patent No. 554,497, dated February 11, 1896.

Application filed June 12, 1895. Serial No. 552,529. (No model.)

*To all whom it may concern:*

Be it known that we, ELIAS O. PHILLIPS and GUSTAV CLASS, Jr., citizens of the United States, and residents of Union, county of Hudson, State of New Jersey, have invented certain new and useful Improvements in Clothes-Line Supports, of which the following is a specification.

The shrinking and snapping of clothes-lines which are constantly exposed to the weather and the inconvenience of getting at the lines for hanging out the clothes and for removing and replacing them have become sources of great annoyance in all large cities where the clothes are dried upon double lines hung between pulleys attached to the walls of adjacent houses, and it is the object of our invention to obviate these difficulties and provide a simple, effective, and economical clothes-line support. To accomplish this we provide a toothed segment which may be attached to the house just below a window in any suitable manner and which is hinged to its support, and to this toothed segment we pivot an arm or lever which carries a spring-pawl for engaging with the segment-teeth and a pulley-block for the clothes-line to pass through. The line is also passed through a stationary pulley supported on an adjacent wall and the ends tied or spliced together to form an endless line. By adjusting the position of the pivoted arm the clothes-line can be tightened or loosened.

In order that our invention may be fully understood, we will first describe the same with reference to the accompanying drawings and afterward point out the novelty in the annexed claims with more particularity.

In said drawings, Figure I is a front elevation of our improved clothes-line support, showing its position under a window. Fig. II is a side elevation of the same, parts of the lever and pawl being shown in section.

The size of the device has been exaggerated to render the structure clearer.

1 is a supporting plate or bracket adapted to be secured to a window-sill or to the wall beneath the sill by nails or bolts 2, said bracket having a lower integral bearing, 3, and an upper removable angle-plate bearing, 4. The upper removable bearing, 4, is secured in place by a screw 5.

6 is a semicircular segment formed with integral bearing-lugs 7, which journal in the bearings 3 and 4 of the bracket for pivotally supporting it, two or more ratchet-teeth 8 on its curved edge, and a central bearing for the supporting-arm.

10 is an arm or lever, formed preferably of a channel-bar with a lower bifurcated end $10^a$, the legs of which bifurcated portion straddle the segment 6 and are pivoted to the central bearing by bolt 11. The pawl 12, having the long operating-handle $12^a$, is pivoted to the lever 10 in the channel, a leaf-spring 13 being riveted to the lever in the channel and having its free end bearing in the recess formed in the handle $12^a$ for holding the pawl 12 into engagement with the segment-teeth 8.

15 is a pulley attached to the upper end of lever 10 by a link 16 and bolt 17, the clothes-line 18 passing through said pulley and a stationary pulley (not shown) attached to an adjacent wall.

When the clothes-line is in use the lever 10 is pulled up to the position shown in full lines, which will tighten the line and place it in position to be conveniently reached for putting out and taking in the clothes. When the clothes are removed the pawl 12 is disengaged and the lever 10 thrown down to a lower position, as shown in dotted lines, which will loosen the clothes-line and free it from any possibility of breaking by shrinking under the action of the weather. We have found it desirable to make the lever 10 about sixteen inches in length, this being a convenient length to operate and affording sufficient slack for all purposes. The support 1, segment 6, lever 10, and pawl 12 can be most economically made by separately casting them and connecting them together by suitable bolts. We prefer to have the clothes-line support secured just below a window because of the convenient position and because it insures against forgetting the line and leaving it stretched over night, whether with or without clothes, as it is impossible to close the outside blinds without first lowering the support.

By pivoting the segment to its support the device can swing easily to any angle to accommodate the direction of the line.

Having thus described our invention, what we claim, and desire to secure by Letters Patent, is—

1. In a clothes-line support, the combination of a horizontally-swinging toothed segment hinged to a suitable support, an arm pivoted to said segment so as to swing vertically and provided with a pawl which engages said teeth, and a pulley pivotally connected to said arm around which the clothes-line passes, substantially as set forth.

2. In a clothes-line support, the combination of a suitable bracket or support adapted to be attached to a house or other object, a fixed and a removable bearing on said bracket, a toothed segment pivoted between said bearings, an arm or lever pivoted to said segment, a spring-pawl carried by said arm or lever and adapted to engage the teeth of the segment, and a pulley pivotally attached to the arm or lever, substantially as and for the pupose set forth.

3. In a clothes-line support, the combination of a suitable bracket adapted to be attached to a supporting object, a toothed segment hinged to said bracket, an arm or lever formed of channel-iron and having a bifurcated lower end which embraces or straddles the segment and is pivoted thereto so as to swing vertically, a spring-pawl pivoted in the channel of the arm or lever in position to engage the teeth of the segment, and a pulley pivotally connected to the arm or lever, substantially as set forth.

ELIAS O. PHILLIPS.
GUSTAV CLASS, Jr.

Witnesses:
WM. E. KNIGHT,
M. V. BIDGOOD.